Dec. 12, 1939.                J. STEINHOFF                2,182,950
                    DIRECTION FINDER OR COURSE INDICATOR
                        Filed May 14, 1935       2 Sheets-Sheet 1
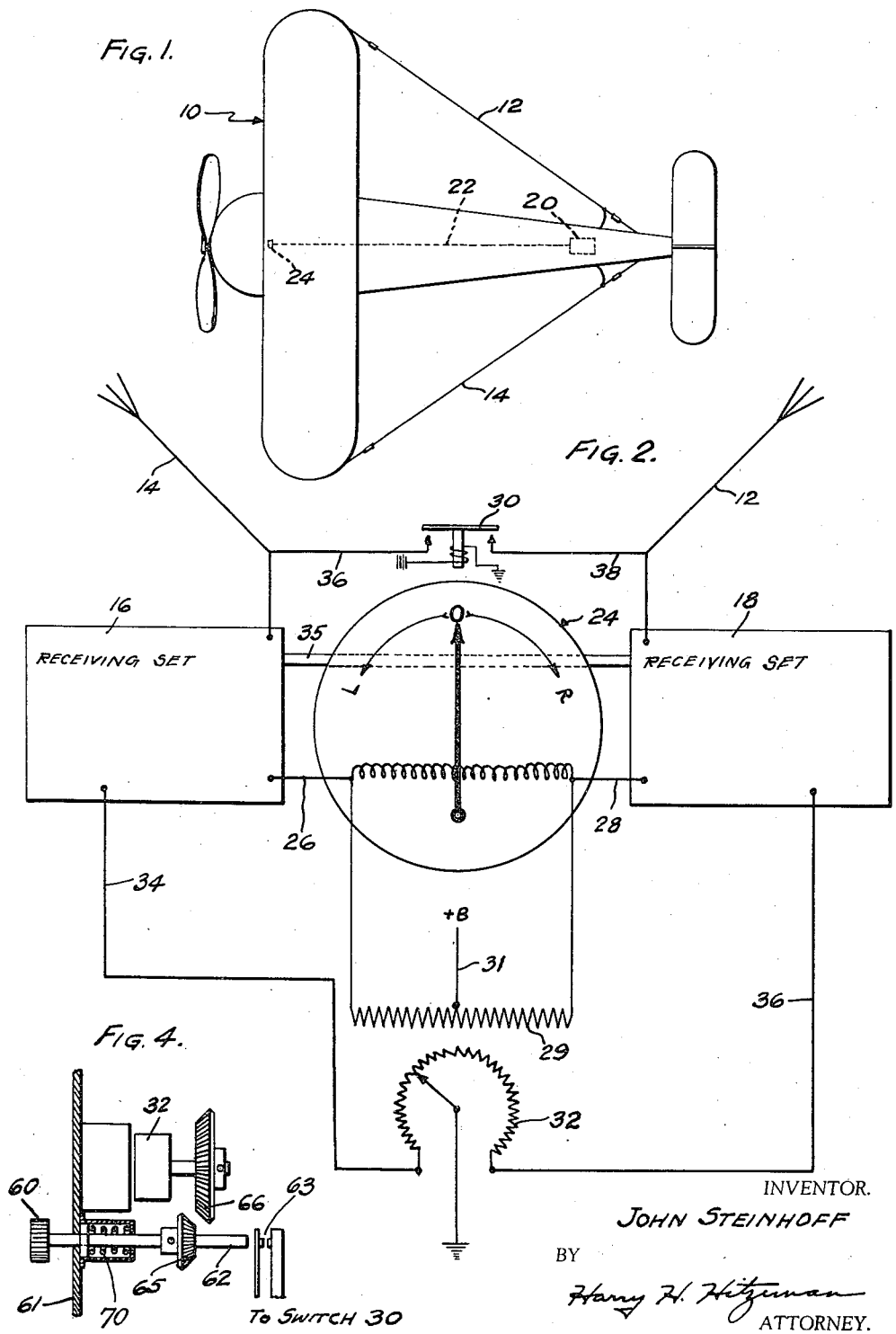
INVENTOR.
JOHN STEINHOFF
BY
Harry H. Hitzeman
                    ATTORNEY.

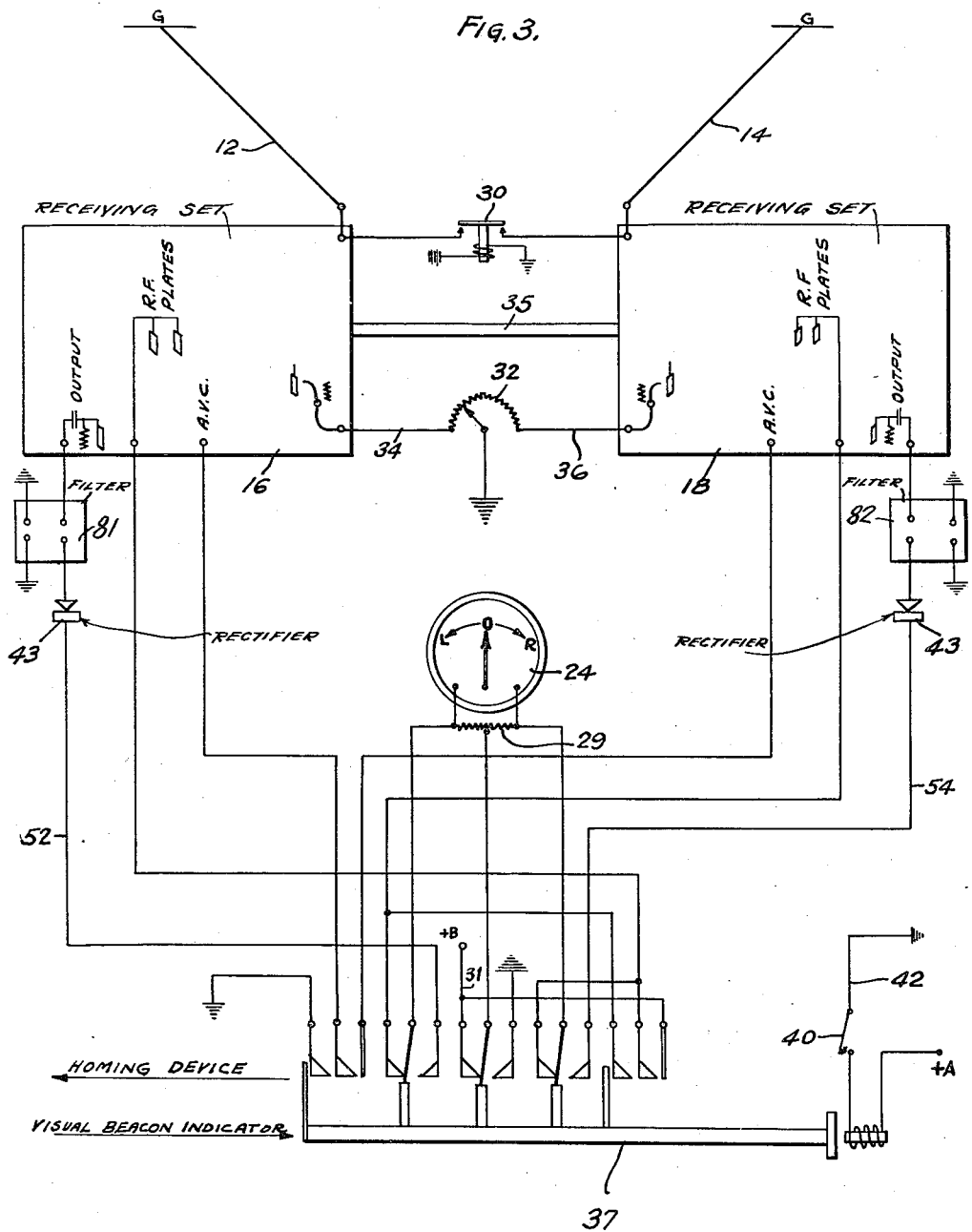

Patented Dec. 12, 1939

2,182,950

UNITED STATES PATENT OFFICE 2,182,950

DIRECTION FINDER OR COURSE INDICATOR

John Steinhoff, Chicago, Ill., assignor, by mesne assignments, to William A. Fairlie Application May 14, 1935, Serial No. 21,426

7 Claims. (Cl. 250—11)

The present invention relates to improvements in direction finders or course indicators for airplanes, dirigibles, or other aircraft and seagoing vessels.

The invention relates more particularly to improved electrical radio controlled apparatus for this purpose.

The principal object of my invention is to provide an improved electrical apparatus by the use of which the navigator of a vessel in one of the classes mentioned is capable of selecting a destination and by the use of the apparatus direct his vessel to that destination.

There are at the present time two distinct types of course indicators that are in use in this country by commercial air lines, the Federal Government, and private owners of airplanes. One type of indicator is known as a homing device. This instrument installed on a ship or plane comprises generally a radio receiving set capable of being tuned in on a broadcasting station at the desired destination. The instrument includes among other things, an indicator controlled by the radio receiver and capable of constantly indicating whether the direction of travel is in a straight line towards the destination or whether the ship is slightly off a true course to the right or to the left. These devices are capable of use with any transmitted modulated radio wave such as the type used in the usual commercial broadcast.

A device of this type is shown and described in the patent to G. G. Kruesi, et al., issued April 17, 1934 and bearing number 1,955,505.

The second type of course indicator to which I refer is known as the visual beacon or beam indicator. An instrument of this type installed on a ship or plane also generally comprises a radio receiving set capable of being tuned in on a specified double modulation radio range beacon course and upon entering the path of the beam controls a visual instrument capable of constantly indicating whether the plane or ship is travelling directly on the path of the beam or whether the plane or ship is deviating slightly to the right or to the left.

A device of this type is shown and described in Research Paper No. 336, reprint from Bureau of Standards Journal of Research, vol. 7, July, 1931 issued by the United States Department of Commerce.

My invention contemplates the provision in a single unit, apparatus capable of functioning as a homing device or course indicator and also as a visual beacon or beam indicator.

A further object is to provide a device of the character described that is comparatively simpl in construction and can be easily and quickl installed. A further object is to provide a de vice of the character described capable of accu rate and positive operation long distances fror a beam transmitting station or commercial broad casting station.

A further object is to provide a device of th character described capable of remote operatio and control.

Other objects and advantages will be mor apparent from the following description wherei reference is had to the accompanying two sheet of drawings, in which Fig. 1 is a diagrammatical view illustrating th installation of my apparatus in an airplane;

Fig. 2 is a wiring diagram showing a circu that is used when the device is operating as homing or course indicator;

Fig. 3 is a wiring diagram illustrating a circu capable of use either as a homing device or visual beacon indicator; and Fig. 4 is a sectional view illustrating one forn of construction of the sensitivity compensatin control.

Referring to the drawings, in Figure 1 is show an airplane 10 of any usual type provided with pair of aerials 12 and 14. The aerials are adapte to be supported in the usual manner upon th ship, being placed, however, at opposite angle with respect to each other and being placed upo opposite sides of the ship. It will be furthe noted that the aerials are both placed at the sarr angle with regard to the length of the ship. Eac aerial is adapted to be connected to tuned rad frequency circuits in two separate but identic sets 16 and 18 which for convenience may l mounted as shown at 20 in the tail of the shi A suitable conduit 22 may extend forward to th instrument panel in the cockpit where the ind cator 24 may be located.

Each of the receiving sets 16 and 18 is provide with an automatic volume control circuit whic is adapted to vary the plate current in the pla circuits of the radio frequency tubes in respe to the volume of the input signal. Lines 26 ar 28 may extend from these circuits to a zero cent milliammeter 24 which is provided with a cent tap shunt 29. A common line 31 is adapted connect the plus B plate supply current sour to the midpoint of the shunt and thence to tl plates of the radio frequency tubes which a controlled by the automatic volume control ci cuit. The indicator milliammeter 24 is adapt to measure the difference in current between tl o receivers and not the actual current flowing
ereto. For example, if the circuits are bal-
ced and each is passing ten mils, no current
ll flow through the meter and it will remain
zero. However, if the left receiver draws nine
d the right ten mils, there will be a difference
potential in the extremities of the shunt, and
rrent will flow through the meter in such a
ection that the indicator needle will be moved
the right. On the other hand, if the left re-
iver draws ten and the right nine mils, cur-
it will flow through the meter in the opposite
ection and the needle will be moved to the
t. As it is almost impossible to keep the re-
.vers balanced at all frequencies, I provide a
isitivity balancing control 32 positioned be-
een the two receivers and connected by the
res 34 and 36. The sensitivity balancing con-
il 32 operates to balance the sensitivity of the
o receiving circuits. To facilitate this opera-
n, there is provided a switch 30 so that the
ne may be done after tuning the receivers from
e frequency to another. This is accomplished
closing the switch 30 connected between the
o aerials 12 and 14 by the lines 36 and 38. As
is far described the device operates as follows:
in flight to a desired destination, the receivers
: tuned to a radio station at the destination
d are balanced by closing switch 30, which per-
ts the same input to each receiver regardless
the position of the aerials with respect to the
)adcasting station. By operating the sensitiv-
compensating control 32 to a point where the
ter reads zero the receivers will be balanced
d switch 30 may be opened. In this condition,
he ship is headed directly toward the destina-
n each aerial will pick up the same amount of
rgy. However, if the ship is turned off its
irse to the right, for example, the left aerial
l pick up more signal than the right due to the
t that the left aerial is more in line with the
tion than the right. Therefore the right re-
ver will pass more current through the meter
in the left causing the indicator needle to swing
the right. The reverse of this action will take
ce if the ship moves off its course to the left.
The two radio receivers may be mounted in one
e and the means for tuning or for shifting
m one frequency band to another and the bal-
ing of the receivers may be operated by re-
te control. A shaft 35 connects the variable
idensers of the two circuits so that both radio
eivers are simultaneously tuned on the same
quency.
is thus far described it will be apparent that
imple and accurate homing device has been
vided. It will be obvious that the type of
io wave which is being received is immaterial
l that static or other weather disturbances
l have no effect upon the operation of the de-
:. This is due to the fact that the two receivers
in phase and that when the receivers are bal-
ed any stray impulse such as static, motor
rferences, etc., is picked up the same in each
ial and amplified the same in each receiver
reby balancing out across resistor 29, and not
cting the indicator 24. It is believed to be
ious that the direction indication is received
: to the difference in current which flows to
plates of the radio frequency tubes which are
trolled by the automatic volume control cir-
s of each receiver.
n Figure 3, I have shown a diagrammatic il-
ration of a modified form of the invention
rein I provide in the same circuit a homing device or a direction indicator such as I have
described and a visual beacon indicator. The cir-
cuit may be generally similar in some respects
to that previously described and may include the
aerials 12 and 14, radio receivers 16 and 18, switch
30, sensitivity compensating control 32, and the
indicator 24.

In connection with this circuit I provide a multi-
contact relay 37. This relay is adapted to be
operated by a remotely operated closing switch
40 in the plus A line 42. The sensitivity compen-
sating control 32 is connected by the lines 34 and
36 to the cathodes of the first radio frequency
stage of each receiver.

By closing switch 40 which operates to close the
multi-contact switch relay, the connections are
changed and the meter is switched from the plate
circuits of the radio frequency tubes to the out-
put circuits of each receiver. At the same time,
the plates of the radio frequency tubes are con-
nected to the power supply and the automatic
volume control action is grounded out of each
receiver, all of which changes the device from a
homing device to a visual radio beacon indi-
cator. Copper oxide rectifying units 43 and fil-
ter 81 and 82 in lines 52 and 54 are connected
between the resistance, capacity output circuits
of each receiver and the meter. The sensitivity
balancing procedure is the same as previously
mentioned. The action of the meter now indi-
cates the difference between the modulated signals
received by the two receivers, thereby enabling
flight on the established Department of Com-
merce radio beacons.

In using my improved device as a visual beacon
indicator, the audio output of each receiver is
rectified by copper oxide rectifiers 43 and the
meter 24 is connected so as to show the difference
in the outputs.

In Fig. 4 I have shown a sensitivity compensat-
ing control knob 60 mounted on the outside of
the instrument panel 61 of an airplane, and car-
rying a shaft 62 adapted to be pushed in against
contacts 63 which close a circuit to energize a
solenoid to close switch 30. At the same time
a bevel gear 65 engages a gear 66, and by rotat-
ing the knob the compensating control device is
regulated. Spring means 70 are provided to dis-
engage the gears and open the contacts shown.

While I have illustrated and described a spe-
cific embodiment of my invention, it will be ap-
parent to those skilled in the art that changes
and modifications may be made in the specific
details shown, and I do not therefore wish to be
limited to the specific embodiment disclosed here-
in, but desire to include and have protected by
Letters Patent all forms of my invention that
come within the scope of the appended claims.

I claim:

1. A radio directional device comprising in
combination a pair of receiving sets each hav-
ing automatic volume control, means for impress-
ing the same transmitted modulated radio wave
upon both, a current supply circuit common to
both sets, an electrically operable indicator in
said circuit, a plural contact switch, electrical
connections between said switch and contacts and
said indicator, electrical connections between
said switch contacts and each set, and said switch
being selectively operable to one position to in-
clude said indicator in the volume control of both
sets and to another position to cut out the vol-
ume control of each set and to place said indica-
tor in the audio output of each.

2. In a radio direction finder, two receiving sets, means for equalizing the inputs to said sets, means for balancing the sensitivity of said sets, a manually controlled member movable in one direction to place it in operative relation with said balancing means and in another direction to adjust said balancing means, and means automatically operated responsive to the first movement of said member to effect the operation of said equalizing means.

3. In a radio direction finder, two directive pickup devices responsive to signals from a distant transmitter, means for amplifying the signals received by said devices, respectively, automatic volume control apparatus controlling said amplifying means, an indicator, and means including said volume control apparatus for controlling said indicator to indicate the bearing of said station.

4. In a radio direction finder, means for picking up two separate signal currents from the same distant transmitter, the relative strength of said signals depending on the bearing of said station, means for amplifying said signal currents, said amplifying means including automatic volume control apparatus, two conductors, means including said volume control apparatus for impressing potentials on said conductors, respectively, which are proportionate to the strength of said signals, and a meter bridged across said conductors and constituting means for indicating the bearing of said station.

5. In a radio direction finder, means for picking up two separate signal currents from the same distant transmitter, the relative strength of said signals depending on the bearing of said station, means for amplifying said signal currents, said amplifying means including automatic volume control apparatus, a meter, and means controlled in accordance with the potentials produced by said automatic volume control apparatus responsive to said signals, respectively, for placing corresponding potentials on the terminals of said meter.

6. In a radio direction finder, means for receiving two separate signal currents from the same distant transmitter, the relative strength of said signals depending on the bearing of said transmitter, means for amplifying said signals, said amplifying means including automatic volume control circuits for supplying grid bias potential to the amplifier tubes, an indicator, and circuit connections for operating said indicator to show a bearing to the right or left depending on the relative value of the grid biasing potentials produced by the amplified signals, respectively.

7. In a radio direction finder, means for receiving two separate signals from the same distant transmitter, the relative strength of said signals depending on the bearing of said station, means for amplifying and rectifying said signals, two circuits excluding the said rectifying means and in which the current flow is controlled by potentials derived from the rectified signals, respectively, a source of direct current common to said circuits, an indicator, and means connecting said indicator between corresponding points in said circuits, said indicator including an operating coil constituting a conductive connection between said points.

JOHN STEINHOFF.